(12) United States Patent
Nilsson

(10) Patent No.: US 10,060,462 B2
(45) Date of Patent: Aug. 28, 2018

(54) ASSEMBLING FACILITATING DEVICE

(71) Applicant: Elfa International AB, Vastervik (SE)

(72) Inventor: Peter Nilsson, Vastervik (SE)

(73) Assignee: ELFA INTERNATIONAL AB (SE)

( * ) Notice: Subject to any disclaimer, the term of this patent is extended or adjusted under 35 U.S.C. 154(b) by 582 days.

(21) Appl. No.: 14/407,818

(22) PCT Filed: Jun. 14, 2013

(86) PCT No.: PCT/SE2013/050693
§ 371 (c)(1),
(2) Date: Dec. 12, 2014

(87) PCT Pub. No.: WO2013/191624
PCT Pub. Date: Dec. 27, 2013

(65) Prior Publication Data
US 2015/0152904 A1 Jun. 4, 2015

(30) Foreign Application Priority Data
Jun. 19, 2012 (SE) ...................................... 1250648

(51) Int. Cl.
*F16B 12/24* (2006.01)
*F16B 1/00* (2006.01)
(Continued)

(52) U.S. Cl.
CPC ............ *F16B 12/24* (2013.01); *A47B 47/042* (2013.01); *A47B 96/066* (2013.01); *F16B 12/46* (2013.01);
(Continued)

(58) Field of Classification Search
CPC ............ Y10T 403/42; Y10T 403/4602; Y10T 403/59; Y10T 403/599; Y10T 403/60; Y10T 403/602; F16B 12/24
(Continued)

(56) References Cited

U.S. PATENT DOCUMENTS 2,727,772 A * 12/1955 Hamilton .............. E05C 19/168
109/63.5
3,082,617 A * 3/1963 Kerman .............. E05B 65/0864
292/179
(Continued)

FOREIGN PATENT DOCUMENTS

CH 351186 A 12/1960
CH 383822 A 10/1964
(Continued)

OTHER PUBLICATIONS

Third Party Observation for Application No. EP 20130807296.

*Primary Examiner* — James M Ference
*Assistant Examiner* — Kyle Walraed-Sullivan
(74) *Attorney, Agent, or Firm* — Condo Roccia Koptiw LLP

(57) ABSTRACT

The present disclosure relates to a device for facilitating assembling of a product involving attaching a first surface (5), of a first part, to a second surface (7), of a second part. The device comprises a first unit (9) intended to be embedded in the first surface and a second unit (11) unit intended to be embedded in the second surface, and having a cavity that is open at the second surface. The first unit comprises a piston (17), which is moveable between a retracted position and an extended position, where the piston extends out of the first unit. The second unit comprises an activator part that interacts magnetically with the piston such that the piston moves to the extended position, extending into the cavity, when the first and second surfaces are in contact and the first and second openings are aligned.

18 Claims, 2 Drawing Sheets

(51) Int. Cl.
*A47B 47/04* (2006.01)
*A47B 96/06* (2006.01)
*F16B 12/46* (2006.01)

(52) U.S. Cl.
CPC . *F16B 2001/0035* (2013.01); *Y10T 29/49895* (2015.01); *Y10T 403/16* (2015.01)

(58) Field of Classification Search
USPC .................................................. 403/DIG. 1
See application file for complete search history.

(56) References Cited

U.S. PATENT DOCUMENTS

| | | | | |
|---|---|---|---|---|
| 3,656,328 | A * | 4/1972 | Hughes | E05B 19/0023 70/276 |
| 3,951,558 | A * | 4/1976 | Komarov | F16B 12/14 312/263 |
| 4,016,914 | A * | 4/1977 | Zurko | F16B 5/0208 403/20 |
| 4,166,939 | A * | 9/1979 | Switzer | H01H 13/506 200/332 |
| 4,401,346 | A | 8/1983 | Jones et al. | |
| 4,405,253 | A * | 9/1983 | Stockum | F16B 12/2027 108/158 |
| 4,651,136 | A * | 3/1987 | Anderson | E05B 73/0017 24/110 |
| 4,701,066 | A * | 10/1987 | Beam | A47B 96/20 403/298 |
| 5,061,112 | A * | 10/1991 | Monford, Jr. | F16B 21/183 292/251.5 |
| 5,272,850 | A * | 12/1993 | Mysliwiec | E04B 1/6158 52/582.2 |
| 5,465,460 | A | 11/1995 | Cantone et al. | |
| 5,499,886 | A * | 3/1996 | Short | A47B 95/043 403/381 |
| 6,413,007 | B1 * | 7/2002 | Lambright | A47B 13/003 403/353 |
| 7,217,059 | B1 * | 5/2007 | Rudduck | E04B 2/7457 403/277 |
| 7,267,378 | B2 * | 9/2007 | Drumm | E05C 19/163 292/251.5 |
| 7,306,396 | B1 * | 12/2007 | Chen | B25B 13/5008 279/74 |
| 7,631,467 | B2 * | 12/2009 | Clarke | F16B 12/00 40/468 |
| 7,657,970 | B2 * | 2/2010 | Artsiely | E05F 5/02 16/82 |
| 7,690,293 | B2 * | 4/2010 | Bensley | F04B 9/02 403/DIG. 1 |
| 2003/0053855 | A1 * | 3/2003 | Baur | F16B 5/0614 403/188 |
| 2004/0208690 | A1 * | 10/2004 | Mauri | F16B 12/2063 403/294 |
| 2005/0042027 | A1 * | 2/2005 | Migli | F16B 12/2009 403/409.1 |
| 2006/0012191 | A1 * | 1/2006 | Brei | E05B 47/0009 292/341.17 |
| 2007/0003363 | A1 * | 1/2007 | Tseng | F16B 12/26 403/238 |
| 2007/0134061 | A1 * | 6/2007 | Nance | E05B 47/0038 403/362 |
| 2007/0212166 | A1 * | 9/2007 | Rudduck | E04B 2/7457 403/324 |
| 2008/0134735 | A1 * | 6/2008 | Gallo | E05B 47/023 70/263 |
| 2008/0193209 | A1 * | 8/2008 | Henderson | F16B 5/0275 403/297 |
| 2010/0319291 | A1 * | 12/2010 | Pervan | E04F 15/02 52/588.1 |
| 2011/0049911 | A1 | 3/2011 | Bosshard et al. | |
| 2011/0209509 | A1 * | 9/2011 | Nickeas | E05B 47/0045 70/276 |
| 2012/0073530 | A1 * | 3/2012 | Nitz | F01L 1/185 123/90.1 |
| 2012/0119629 | A1 * | 5/2012 | Nelson | A47B 87/00 312/111 |
| 2012/0301217 | A1 * | 11/2012 | Liu | A47B 95/00 403/287 |
| 2013/0149029 | A1 * | 6/2013 | Changsrivong | F16B 17/00 403/361 |
| 2013/0239509 | A1 * | 9/2013 | Wang | F16B 12/125 52/704 |

FOREIGN PATENT DOCUMENTS

| | | | |
|---|---|---|---|
| CN | 101219019 | A | 7/2008 |
| DE | 1704805 | U | 8/1955 |
| DE | 1818331 | U | 9/1960 |
| DE | 7313052 | U | 7/1973 |
| DE | 10037332 | A1 | 2/2002 |
| DE | 10336433 | A1 | 3/2005 |
| DE | 10-2006-012096 | A1 | 9/2007 |
| DE | 102006020949 | A1 | 11/2007 |
| DE | 20-2009-011772 | U1 | 12/2009 |
| DE | 10-2008-037764 | A1 | 2/2010 |
| EP | 2093358 | A1 | 8/2009 |
| GB | 1268362 | A | 3/1972 |
| GB | 2210130 | A | 6/1989 |
| GB | 2254644 | A | 10/1992 |
| JP | 2001182723 | A | 7/2001 |
| JP | 2009-160033 | A | 7/2009 |
| JP | 2007-175133 | A | 7/2012 |
| KR | 10-2012-0031741 | A | 4/2012 |
| RU | 2181447 | C2 | 4/2002 |
| WO | WO-9203631 | A1 | 3/1992 |
| WO | WO 2007128515 | A2 * | 11/2007 ............. F16B 12/00 |

* cited by examiner

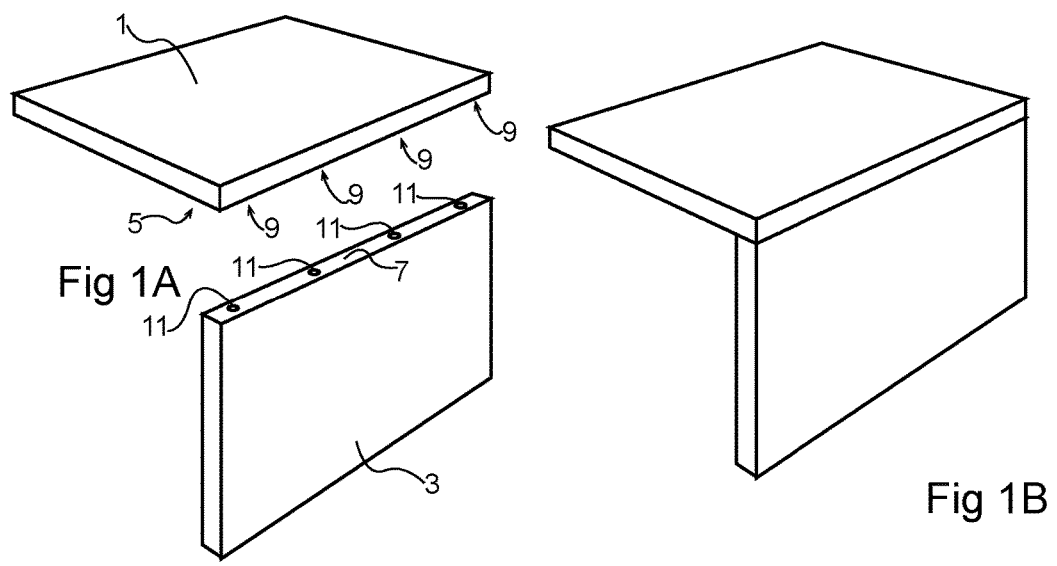
Fig 1A
Fig 1B
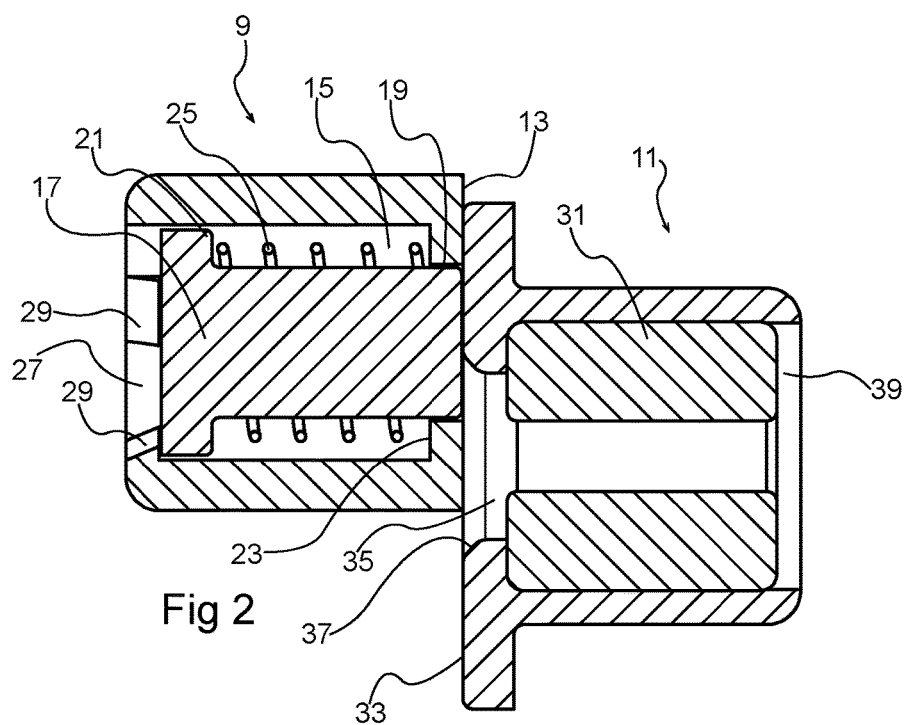
Fig 2

ASSEMBLING FACILITATING DEVICE

This application is the National Stage entry under 35 U.S.C. § 371 of PCT Application No. PCT/SE2013/050693, filed Jun. 14, 2013, which claims the benefit of Swedish Patent Application No. 1250648-1, filed Jun. 19, 2012, the disclosures of which are all herein incorporated by reference in their entirety.

TECHNICAL FIELD

The present invention relates to a device for facilitating assembling of a product, wherein the assembling involves attaching a first part to a second part, such that a first surface of the first part, and a second surface of the second part, have a mutual contact surface.

BACKGROUND

Such devices may be useful, for instance, when assembling a frame for kitchen cupboards or drawers, and in many other products, typically when the end user assembles a product in his or her home without professional assistance. In many cases, different e.g. laminated board pieces are to be assembled, often by attaching one edge of one board piece to a flat surface of another. An assembling facilitating device may then consist of a wooden plug that is fitted into a hole in the surface of one piece. The plug length may then be twice the depth of the hole, such that one half of the wooden plug extends from the hole. The extending half may then be inserted into a corresponding hole the other piece when the pieces are fitted together. A number of such plugs may be used. This may not be enough to assemble the pieces, but keeps the pieces correctly aligned when, for instance, screws are applied to keep the pieces together. Moreover, the wooden plug offers some stability by preventing mutual movement between the pieces in a direction that is perpendicular to the plug axis.

One problem with such plugs is that they may be difficult to insert. Tolerances are important, as too thin plugs tend to fall out of the holes and too wide plugs may break the board piece when forced into the hole.

SUMMARY

One object of the present disclosure is therefore to provide an assembling facilitating device that makes assembling even easier. More specifically, the disclosure then relates to a device for facilitating assembling of a product, wherein the assembling involves attaching a first part to a second part, such that a first surface of the first part and a second surface of the second part have a mutual contact surface. The device comprises a first unit intended to be embedded in the first surface, flush therewith, being hollow, and having a first opening facing the first surface. The device further comprises a second unit intended to be embedded in the second surface flush therewith and having a cavity facing the second surface. The first unit has a piston which is moveable between a retracted position, where the piston is retracted in the unit, and an extended position, where the piston extends out through the first unit's opening. The second unit comprises an activator part that interacts magnetically with the piston such that the piston automatically moves to the extended position, extending into the other unit's cavity, when the first and second surfaces are in contact and the first and second units are aligned.

This means that when the two pieces are correctly aligned, the piston of the first unit snaps into the cavity of the second. This simplifies the process considerably for the user, who does not need to handle plugs or the like. Moreover, when the pieces are correctly aligned, a distinct clicking sound informs the user that the alignment is correct and that e.g. screws can be used to permanently fasten the parts. This gives the user an acknowledgement that the assembling process is carried out correctly.

The piston may be made of a ferromagnetic material, and the activator part may comprise a permanent magnet. The permanent magnet may be annular.

A spring may be arranged to urge the piston towards the retracted position. The force that is applied on the piston by the spring may then be exceeded by the force applied by the activator part when the first and second surfaces are in contact and the first and second openings are aligned. Then the piston snaps out when the units are aligned, but if the parts are subsequently separated, the piston snaps back into the retracted position.

The second opening of the second device may be tapering in the direction towards the inner part of the second cavity, the outer part of the second opening being wider than the piston. This means that the piston can begin moving towards the extended position even before perfect alignment is achieved, and may help mutually moving the first and second parts such that more or less perfect alignment is achieved.

BRIEF DESCRIPTION OF THE DRAWINGS

FIG. 1A-1B illustrate a situation where a device according to the present disclosure may be useful.

FIGS. 2 and 3 shows an example of a device according to the present disclosure.

DETAILED DESCRIPTION

Figure 3:
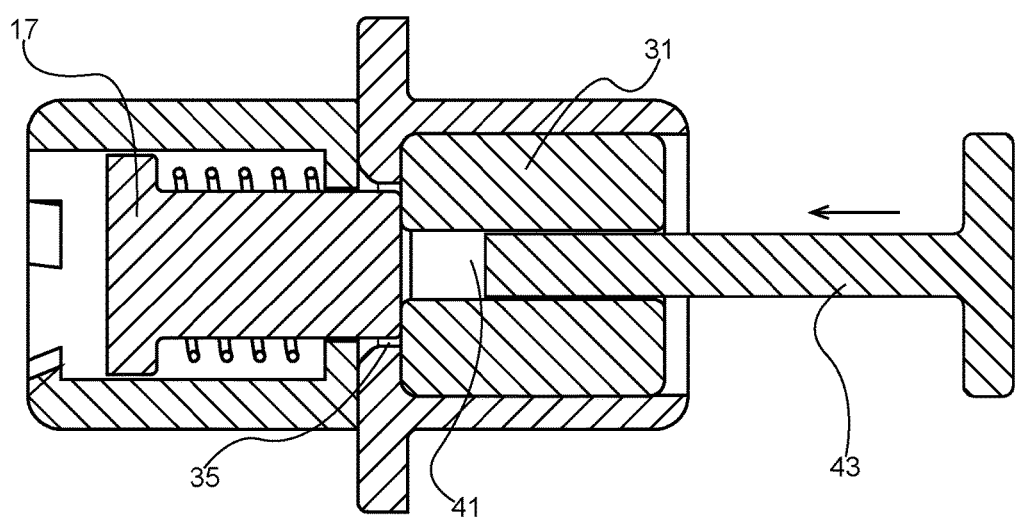

FIGS. 1A and 1B illustrate a situation where a device according to the present disclosure may be useful. Typically, a product is to be assembled which comprises a number of parts of which a first part 1 and a second part 3 are shown in the form of board pieces. When these parts are assembled a surface 5 close to the edge of the first part (surface obscured in FIG. 1) is made to abut an edge surface 7 of the second part 3, such that a mutual contact surface is established where the parts are in contact. A contact surface may be curved but is more likely flat in most cases.

One typical situation when this is done may be when assembling a cabinet, e.g. for a kitchen. This involves assembling a number of such board pieces. The same may be the case where a bookshelf or another storage system is assembled, or any other type of product.

In the present disclosure, devices for facilitating assembling are provided in the abutting portions of the surfaces 5, 7. This is done by providing a unit of a first type 9 (concealed in FIG. 1) in the first surface 5 and a unit of a second type 11 in the second surface 7. The first and second types of unit are complementing and are placed in pairs, in the illustrated case four pairs, such that a unit of the first type faces a unit of the second type when the two parts 1, 3 are correctly mutually aligned. The units, that will be described later, are automatically activated when the surfaces abut in correct alignment, such that a piston in one of the units snaps into a cavity in the facing complementary unit. This serves to keep the parts aligned in this position while other fastening means, a nail, a screw or the like (not shown), may be used at other locations to permanently attach the two parts to each other. This facilitates the assembling as the snapped units keep the parts aligned while being fastened to each other. Moreover, the user is informed, by the sound of the snap, that correct alignment has been attained. Further, even when the parts are finally assembled, the first and second units assist in the fastening of the parts and may take up some load, particularly shearing between the surfaces. Some applications and variations may even be considered where screws or the like are not needed and the two parts are kept together by the snapped units only.

FIG. 2 shows in cross section an example of a device for facilitating assembling according to the present disclosure. The device has a first and a second unit, which in FIG. 2 are misaligned, such that the device is not activated. The first unit 9 may be built as a hollow cylinder, typically made of plastic, with a circular connection surface 13 being flush with the surface of the part (cf. 1, FIG. 1A) in which the the first unit 9 is embedded. Being hollow, the first unit has an inner cavity 15, where a piston 17 can move. There is an opening 19 in the connection surface 13 of the first unit. The piston 17 is moveable between a retracted position, which is shown in FIG. 2, where the piston is retracted, and an extended position, which is shown in FIG. 3, where the piston 17 extends out of the inner cavity 15, through the opening 19. The first unit 9 may placed and glued in a hole, prepared in the first part's surface, when the first part is produced.

The piston 17 may be circular symmetric around an axis parallel with its movement and may have a wider head portion 21 at the end distant from the opening 19 in the connection surface 13. Adjacent to this connection surface 13, and surrounding the opening 19, the unit may have an inner support surface 23. The piston may be spring loaded by a compressed spring 25, resting on the support surface 23 and the head portion 21 of the piston 17, such that the latter is urged away from the opening 19. The piston 17 may be made of a ferromagnetic material. The opening 19 is narrower than the head portion 21 and the spring 25, such that those parts cannot fall out of the cavity 15.

The first unit 9 may have a mounting opening 27, through which the piston 17 and the spring 25 can be inserted. The mounting opening 27 has a number of lips 29, extending from its periphery and inwards. The outer surfaces of the lips 29 may be bevelled, such that the head portion 21 of the piston can be snapped past the lips when introduced, but once introduced the lips prevent the piston 17 from slipping out, even as the piston head is urged towards the lips 29 by the spring 25.

The second unit 11 may as well be built as a hollow cylinder with a circular connection surface 33 being flush with the surface of the part (cf. 3, FIG. 1A) in which the the second unit 11 is embedded. The second unit 11 may also be made as a plastic, hollow cylinder, and comprises an activator part 31 which may be a permanent magnet. This magnet 31 is embedded in the second unit 11 at a distance beneath the connection surface 33, leaving a cavity 35 in front of the magnet. The inner part of the cavity, closest to the magnet, may be wide enough, but only just, to accommodate the narrower end of the first unit's 9 piston 17. The outer part 37 of the cavity 35 may be funnel shaped, having walls that slant from the connection surface 33 towards the inner part. The outer part may 37 e.g. be 10-30% wider than the corresponding end of the piston to provide a guiding function while the cavity 35 is just a few percent wider, depending on the allowed play. The second unit 11 may comprise a mounting opening 39 at the inner end of the unit, distant from the cavity 35. The mounting opening 39 may be large enough to allow the magnet 31 to be inserted. The second unit 11 may be embedded in its surface in the same way as the first unit.

In FIG. 2, the first and second units 9, 11 are misaligned but in FIG. 3 this is no longer the case, which results in the device being activated. Thus, the piston 17, activated by the magnet 31, snaps into the cavity 35, overcoming the force of the spring 25, which is compressed. As the end of the piston 17 only just fits in the cavity 35, further mutual movement of the parts, parallel with the connecting surfaces 13, 33 is no longer possible. As further the narrow part of the piston 17 has a size closely corresponding with the opening 19, and the head portion 21 of the piston fits snugly in cavity 15, very little play is allowed. Further, the connection surfaces are kept together to some extent by the force of attraction between the piston and the magnet.

Therefore, further assembling of the two parts 1, 3 (cf. FIG. 1) is considerably facilitated, especially if the user works alone.

The funnel shaped outer part 37 of the cavity 35 may be allows the piston itself to correct a minor misalignment while entering into the cavity providing a guiding function.

The piston entering the cavity further produces a clicking sound which provides a feedback to the user that correct alignment has been attained. The magnet 31 may be annular, having an axial hole 41 running to the cavity 35, to optionally allow a tool 43 to release the magnet, as illustrated in FIG. 3.

The invention is not restricted to the disclosed embodiment, and may be varied and altered within the scope of the appended claims. For instance, the piston may consist of a permanent magnet material, and the activator part 31 may then consist of another permanent magnet or a ferromagnetic material, as long at the activator part and the piston attract each other. Further, even though the first and second units have been illustrated as rotational symmetric around the piston's axis of movement, other configurations are of course possible.

The invention claimed is:

1. A device for facilitating assembling of a furniture product, the device comprising:
a first furniture unit configured to be embedded in a first surface, wherein the first furniture unit comprises a first opening that is flush with the first surface when embedded, and the first opening allows access to a hollow portion of the first furniture unit;
a second furniture unit comprising a cavity, wherein the second unit is configured to be embedded in a second surface, the second furniture unit is flush with the second surface when embedded, and the second furniture unit comprises a second opening that allows access to the cavity; and
the first furniture unit further comprising a piston and a spring that urges the piston towards a retracted position, the piston being configured such that the piston is moveable between the retracted position and an extended position, wherein in the retracted position the piston is retracted within the hollow portion of the first furniture unit, and in the extended position, the piston extends through the first opening of the first furniture unit, and wherein the second furniture unit further comprises an activator part that is configured to interact magnetically with the piston, and wherein the piston is configured to remain in the retracted position under a first force applied on the piston by the spring until the first force is exceeded by a second force applied by the activator part, resulting in the piston automatically entering the extended position with at least a portion of the piston being positioned in the cavity of the second furniture unit when the first and second surfaces are in contact with each other and the first and second openings are aligned.

2. The device according to claim 1, wherein the piston comprises a ferromagnetic material, and the activator part comprises a permanent magnet.

3. The device according to claim 2, wherein the permanent magnet is annular.

4. The device according to claim 1, wherein the second opening of the second furniture unit is tapering in the direction towards the inner of the second cavity, the outer part of the second opening being wider than the adjacent part of the piston.

5. A furniture product comprising a first furniture part and a second furniture part, wherein:
the first furniture part comprises a first surface, and the second furniture part comprises a second surface, the first and second surfaces being devised to be mutually abutting when the furniture product is assembled;
the first and second surfaces comprise one or more assembly facilitating devices, each assembly facilitating device comprising a first type of assembly unit comprised in one of the first or second surface, and a second type of assembly unit comprised in the other of the first or second surface;
the first type of assembly unit comprises a first opening, a piston and a spring that urges the piston towards a retracted position, the piston being moveable between the retracted position and an extended position such that the piston is retracted within a cavity of the first type of assembly unit when in the retracted position and the piston extends through the first opening when in the extended position; and
the second type of assembly unit comprises a second opening to a cavity and an activator part, the activator part configured to interact magnetically with the piston of the first type of assembly unit such that the piston is positioned in the extended position when the first and second surfaces are in contact and the first and second openings are aligned, and such that the force applied on the piston by the spring is exceeded by the force applied by the activator part when the first and second surfaces are in contact and the first and second openings are aligned.

6. The furniture product according to claim 5, wherein the first and second types of assembly units of the one or more assembly facilitating devices are configured to be flush with one of the first or second surfaces.

7. The furniture product according to claim 5, wherein the piston is comprised of a ferromagnetic material, and the activator part comprises a permanent magnet.

8. The furniture product according to claim 5, wherein one or more of the first and second furniture parts comprise a part of a cabinet, a part of a shelf, or a part of a storage unit.

9. The furniture product according to claim 5, wherein the second type of assembly unit is configured such that the piston entering the second opening results in an audible sound.

10. The furniture product according to claim 9, wherein the audible sound is indicative that the first and second furniture parts are assembled.

11. The furniture product according to claim 5, wherein the cavity of the second type of assembly part is substantially shaped as a funnel.

12. A method for aiding the assembly of a first furniture part and a second furniture part, the method comprising:
aligning a first surface of the first furniture part with a second surface of the second furniture part such that the first and second surfaces are mutually abutting, wherein the first and second surfaces comprise one or more furniture assembly facilitating devices, a first portion of each furniture assembly facilitating device is comprised in one of the first or second surface, and a second portion of each furniture assembly facilitating device is comprised in the other of the first or second surface; and
transitioning a piston comprised in the first portion of each furniture assembly facilitating device from a retracted position to an extended position, wherein the first portion of the furniture assembly facilitating device comprises the piston, a first opening, and a spring that urges the piston towards the retracted position, wherein the piston is retracted within a cavity of the first portion of the furniture assembly facilitating device when in the retracted position and the piston extends through the first opening when in the extended position, and wherein the transitioning of the piston is due to a magnetic interaction of the piston of the first portion of the furniture assembly facilitating device and an activator part of the second portion of the furniture assembly facilitating device, the magnetic interaction resulting in the piston of the first portion of the furniture assembly facilitating device entering a second opening comprised in the second portion of the furniture assembly facilitating device, the force applied on the piston by the spring exceeded by the force applied by the activator part when the first and second surfaces are in contact and the first and second openings are aligned.

13. The method according to claim 12, wherein each of the first and second portions of each furniture assembly facilitating device are flush with one of the first or second surfaces.

14. The method according to claim 12, wherein the piston is comprised of a ferromagnetic material, and the activator part comprises a permanent magnet.

15. The method according to claim 12, wherein one or more of the first and second furniture parts comprise a part of a cabinet, a part of a shelf, or a part of a storage unit.

16. The method according to claim 12, wherein the piston of the first portion of the furniture assembly facilitating device entering the second opening of the second portion of the furniture assembly facilitating device results in an audible sound.

17. The method according to claim 16, wherein the audible sound is indicative that the first and second furniture parts are assembled.

18. The device according to claim 1, wherein one or more of the first and second furniture parts comprise a part of a cabinet, a part of a shelf, or a part of a storage unit.

* * * * *